United States Patent Office 3,455,891
Patented July 15, 1969

3,455,891
METHOD OF POLYMERIZING ISOPRENE WITH ZIEGLER TYPE CATALYST
Deloss E. Winkler, Orinda, Roy G. Hayter, Berkeley, and William H. Stubbs, Oakland, Calif., assignors to Shell Oil Company, New York, N.Y., a corporation of Delaware
No Drawing. Filed Oct. 20, 1966, Ser. No. 588,001
Int. Cl. C08d 1/14, 3/12
U.S. Cl. 260—94.3                    5 Claims

ABSTRACT OF THE DISCLOSURE

A method of polymerizing isoprene to high molecular weight polymer having low gel content and at least about 95% cis 1,4-content comprising contacting isoprene with a Ziegler type catalyst mixed with a preformed amine-aluminum dialkylchloride complex.

---

The present invention relates to the polymerization of isoprene. More specifically, the invention relates to the polymerization of isoprene to produce high yields of polymer having a high cis 1,4-content, high molecular weight and especially low gel content.

The general class of catalyst known as Ziegler catalysts has been investigated in many ramifications for the polymerization of alpha-monoolefins and of conjugated diolefins. Basically, the catalyst comprises the reaction product of an aluminum organic compound with a titanium halide, for example, but infinite variations on this basic system have been investigated by a number of workers in the field. The claims and counter claims made by various workers have led to much confusion and contradiction, but from the great body of accumulated evidence it is becoming apparent that little is known basically about the catalyst system and its modifications. It can be stated that the art is largely empirical, although attempts have been made to postulate broad classes of catalyst components which are supposed to form polymerization catalysts having one virtue or another.

As the art of synthetic rubber manufacture has developed, the commercial requirements have become increasingly stringent insofar as the physical properties of the product are concerned. In times of national emergency a number of physical shortcomings in synthetic rubbers were tolerated simply because no better products were available and natural rubber was largely unobtainable. Since that time, however, substantial advances have been made in the synthetic rubber art and with this the requirements have correspondingly been raised. More specifically, it is now necessary that synthetic polyisoprene have a high cis content (in the order of at least about 95% cis 1,4-isomer); the product must have a relatively high molecular weight, and preferably should have a minimum gel content. The latter requirement is especially difficult to meet when Ziegler catalysts are utilized for the polymerization of isoprene. In order to be economical, it is necessary for a catalyst to effect polymerization at a relatively high rate and to high degree of conversion of monomer to polymer while at the same time it is required that the physical properties of the product and the gel content be as just described. These requirements up to the present time have not been satisfactorily combined in a single catalyst insofar as a Ziegler type of catalyst is concerned.

The necessity for low gel content is not always apparent in the solid rubber used for compounding with such components as extender oils, resins, fillers and reinforcing agents. However, one of the desirable commercial products to be made from synthetic polyisoprene is a latex to be used particularly in the preparation of dipped goods, film and the like. However, there is only one commercially available synthetic polyisoprene latex and this is prepared by a catalyst system other than a Ziegler catalyst. The catalyst system employed for this purpose is one which produces a product having substantially no gel content. With proper manipulation of this product it is possible to form a stable and highly suitable synthetic polyisoprene latex. On the other hand, the average polymer made by the use of Ziegler catalysts has a gel content which may vary from about 4% to about 40% depending on the catalyst system and conditions of polymerization. It has been noted that when the usual catalyst systems are adjusted to provide relatively low gel contents, e.g., in the order of 4–12% the system is either low in activity or low in percent conversion of monomer to polymer.

It is an object of the present invention to provide an improved process for the polymerization of isoprene. It is another object of the invention to provide an improved process for the preparation of a polymerization catalyst. Other objects will become apparent during the following description of the invention.

Now, in accordance with this invention it has been found that a particular method for preparation of a polymerization catalyst of the Ziegler type may be utilized for optimum polymerization of isoprene to result in a high molecular weight product in excellent yield and at satisfactory rates, while at the same time producing a polymer having extremely low gel content. In further accordance with the invention it has been possible to produce latices from the polymers so prepared. The process comprises the sequence of steps as follows:

(a) Separately reacting an aluminum trialkyl with titanium tetrachloride in an Al/Ti mol ratio between about 0.7 and about 1.1 to produce beta-titanium trichloride;

(b) Separately forming a complex of a monoamine with an aluminum dialkyl chloride, the amine:aluminum mol ratio being 0.5 to 1.0.;

(c) Combining the products resulting from steps (a) and (b) to form a catalyst mixture having an aluminum/titanium mol ratio of between about 0.8 and 1.3;

(d) Contacting the catalyst mixture of step (c) with isoprene in an inert hydrocarbon diluent at temperatures between about −30° C. and +50° C. whereby a high yield of polyisoprene is formed, the polymer comprising a conversion of at least about 75% of the original monomeric isoprene and having a gel content less than about 3% by weight.

The formation of the catalyst in the particular sequence of steps recited is apparently essential for the production of a catalytic composition useful for the intended purpose, namely, the production of a low gel, high cis and high molecular weight polyisoprene.

Any other sequence of combining the catalyst components results in one or more technical disadvantages insofar as rate of reaction, percent of conversion, percent cis 1,4-content, high molecular weight or particularly in gel content of the polymeric product. The reasons for this are somewhat obscure but it appears, for example, if the amine is added directly to the aluminum trialkyl prior to combining the latter with titanium tetrachloride, the resulting catalyst does not have the ability to form a high yield of polyisoprene having a low gel content. By "low" is meant a gel content less than about 3%. If the gel content is materially higher than this it is impossible or at least extremely difficult to form stable latices therefrom without prior removal of gel and consequent loss of part of the polymeric product.

The aluminum trialkyls which may be utilized in the formation of the special catalyst composition are those well known in the preparation of the usual Ziegler catalysts. These include aluminum trialkyls in which each alkyl radical has from 1 to 12 carbon atoms per molecule. Suitable alkyl radicals include methyl, ethyl, propyl, butyl, pentyl, hexyl, heptyl, octyl, decyl, and dodecyl. It is possible to utilize aryl or cycloalkyl radicals as well but alkyl radicals are preferred. Suitable species of the aluminum trialkyls therefore comprise trimethyl aluminum, triethyl aluminum, tripropyl aluminum, tributyl aluminum, trioctyl aluminum, and tridodecyl aluminum and mixtures thereof. Mixed alkyls may of course be utilized to result in aluminum components.

The aluminum:titanium mol ratio should be between about 0.7 and 1.1, preferably between about 0.75 and 1.0. If mol ratios outside of these limits are utilized, it has been found that satisfactory results are not obtained in one respect or another, usually with respect to both yield and gel content of the polymer.

The aluminum trialkyl is combined with titanium tetrachloride in an inert hydrocarbon solvent under conditions conducive to formation of beta-titanium trichloride. Thus is that which is utilized as the principal solvent during tetrachloride at temperaures between about 0° and 100° C., preferably between about 50° C. and 90° C., for a period of time between about 5 minutes and 4 hours, preferably between about 10 minutes and 1 hour. The type of hydrocarbon medium in which the reaction product is formed is not critical but preferably is an alkane or alkene, having no more than about 10 carbon atoms per molecule. More preferably still, the hydrocarbon involved is that which is utilized as the principle solvent during polymerization. In a separate vessel the supplementary co-catalyst is complexed with a monoamine. It is necessary to utilize a monoamine as opposed to polyamines since it has been found that the latter are unsatisfactory as Ziegler catalyst components. The co-catalyst complex is formed between a monoamine and aluminum dialkyl chloride. In order to be effective for use in the subject processes, the amine-aluminum mol ratio should be between 0.5 and 1.

The hydrocarbon substituents directly attached to the nitrogen atom may comprise alkyl, cycloalkyl, or aryl radicals. The complex formation appears to take place readily at about room temperatures although higher or lower temperatures may be employed. It appears that there is no chemical displacement of substituents from the aluminum compound but that the amine is coordinated with hte aluminum compound to form a complex.

Suitable amines include primary amines such as methyl amine, ethyl amine, butyl amine, hexyl amine, and octyl amine. Suitable secondary monoamines include dialkyl amines such as diethyl amine, dibutyl amine, dihexyl amine, ethyl hexyl amine. Suitable aryl amines include phenyl amine, benzyl amine, diphenyl amine, while suitable cycloalkyl amines include dicyclohexyl amine. The two most preferred species are both secondary amines, namely, diphenyl amine and di-n-butyl amine. Tertiary amines may be utilized, of which pyridine or quinoline are preferred.

Suitable aluminum dialkyl chloride include those in which the alkyl radicals are those given hereinbefore having 1 to 12 carbon atoms. Typical chlorides include aluminum dimethyl chloride, aluminum diethyl chloride, aluminum dipropyl chloride, aluminum dibutyl chloride, aluminum dicyclohexyl chloride, and the like.

The beta-titanium trichloride formed in the first separate reaction may then be combined with the amine complex formed in the second separate reaction before either of these products is contacted with isoprene. The polymerization is carried out at temperatures between about −30° C. and +50° C., preferably between about −10° C. and +30° C., room temperature is usually satisfactory. Under the conditions recited, the catalyst prepared as described above causes rapid polymerization to occur with at least 75% of the isoprene monomer present to produce a polymer having a high molecular weight, i.e., an intrinsic viscosity in excess of about 3 dl./g. in heptane and at the same time an unexpectedly low gel content, i.e., below about 3% and preferably less than 1%. This latter feature is especially unexpected in view of the fact that prior art processes which sought to achieve such a goal were able to produce gel contents in the order of 5–7% but only at the expense of low rates or of a low degree of conversion. Consequently, the process of preparing the catalyst according to the present invention has a number of interrelated benefits not attained by prior art catalyst compositions of the Ziegler type.

The polymerization may be carried out in any suitable substantially inert hydrocarbon diluent, preferably alkenes, cycloalkanes, alkanes or mixtures thereof. Reaction times will vary with temperature, concentration of the catalyst, and ratio of catalyst to monomer. Typical reaction times are between about 1 and 5 hours, the catalyst concentration being between about 0.0005 and about 0.002 mol per mol of monomer and the monomer being present in an amount between about 10 and about 18% w. based on the total polymerization mixture, including solvent.

Following polymerization, the product may be either isolated as a solid by removal of solvent or may be used directly for the preparation of latices following the advisable removal of catalyst residues such as by washing with water after acidifying to convert the aluminum and titanium to water soluble compounds. Suitable coagulation procedures comprise combination of the solution with steam under pressure and ejection through suitable jets to flash off the solvent and form a porous crumb which is dropped into hot water and eventually drained therefrom and dried in a suitable tunnel drier. The product may be treated before or afterwards by known procedures to remove any amount of the catalyst residues which appears to be advisable for contemplated end uses of the polymer product.

One of the noteworthy features of the products produced according to the process of the present invention is the newtonian behavior exhibited under varying rates of shear. This appears to be attributable to either the extremely low gel content or the low degree of branching experienced with this special catalyst system. The newtonian behavior of these low gel polyisoprenes is sharply contrasted to the non-newtonian behavior of natural rubber and of Ziegler polyisoprenes containing appreciable gel contents.

The following examples illustrate preferred procedures in accordance with the present invention.

Example I

A variety of amines were utilized to determine their effect upon the several aspects of percent conversion, yield, percent gel, intrinsic viscosity and cis 1,4-content of the polymer. A standard beta-titanium trichloride catalyst was prepared by combination of titanium tetrachloride with aluminum triisobutyl utilizing an aluminum/titanium mol ratio of 0.8. The components were heated for 15 minutes at 80° C. in heptane. A separate preparation of the co-catalyst was prepared, the aluminum component being aluminum diethyl chloride. The amines listed in Table I were combined therewith at room temperature in heptane medium, the monoamine being utilized in a proportion of 1 mol of secondary amine per mole of aluminum diethyl chloride, while the primary amines were combined in a proportion of ½ mol of amine per mole of aluminum diethyl chloride.

These two separate preparations were then admixed in heptane and isoprene was added at a temperature of about 25° C. which was maintained for 4 hours. The titanium was present in a concentration of 2.4 millimoles per liter of solvent, while the isoprene was initially at a concentration of 1.8 mol per liter of solvent. The total aluminum/titanium mol ratio was 1.05. Table I below presents the results obtained by this procedure. By comparison, if the amine is omitted, utilizing aluminum diethyl chloride as the unmodified co-catalyst the results as shown in Table I are indeed striking in that the conversion was extremely low (58%) the gel was high (17%) and the cis content was about 2% lower than when amines were utilized in conjunction with the co-catalyst.

TABLE I

| Amine | Total Al/Ti | Percent conversion | G. polymer per g. Ti | Percent w. gel | Intrinsic viscosity, dl./g. | Cis 1,4, percent |
| --- | --- | --- | --- | --- | --- | --- |
| Diethyl | 1.05 | 70 | 725 | 0 | 4.0 | >98 |
| Dibutyl | 1.05 | 80 | 850 | 0 | 3.5 | 98 |
| Di-2-ethylhexyl | 1.05 | 85 | 900 | 2 | 3.4 | |
| Butyl | 1.05 | 83 | 860 | 3 | 3.1 | 98 |
| Cyclohexyl | 1.3 | 75 | 780 | 0 | 3.4 | >98 |
| None | 1.1 | 58 | | 17 | 4.2 | 96.5 |
| No amine or chloride | 0.8 | 54 | 560 | 34 | 3.2 | 97 |

Example II

A low gel (0.2%) polyisoprene prepared by the use of an amine modified catalyst as in Example I was dissolved in benzene to form a 6% solution. An emulsion was formed of the solution by homogenizing with water containing 1% by weight of a rosin soap, following which benzene was stripped off in vacuum. The dilute latex was creamed in the presence of 0.2% by weight of aqueous ammonium alginate to produce a stable latex containing about 50% of total solids. A similar attempt to prepare a latex from a polyisoprene containing about 19% of gel resulted in a large loss of polymer as coagulum.

We claim as our invention:

1. A method for polymerizing isoprene to form high molecular weight polyisoprene having a gel content less than about 3% and a cis 1,4-content of at least about 95% which comprises:
   (a) separately reacting an aluminum trialkyl in which each alkyl radical has from 1 to 12 carbon atoms per molecule with titanium tetrachloride in an Al/Ti mol ratio between about 0.7 and about 1.1 to form beta-titaniumtrichloride at a temperature between 0° C. and 100° C. for a period of time between about 5 minutes and 4 hours;
   (b) separately forming a complex of a monoamine with an aluminum dialkyl chloride, the amine:Al mol ratio being 0.5 to 1.0;
   (c) combining the products resulting from steps (a) and (b) to form a catalyst mixture having an Al/Ti mol ratio of between about 0.8 and 1.3;
   (d) contacting the catalyst mixture of step (c) with isoprene in an inert hydrocarbon diluent at temperatures between about −30° C. and +50° C. whereby a polyisoprene product is formed, said product comprising a conversion of at least about 70% of monomer and having a gel content less than about 3% by weight.

2. A process according to claim 1 wherein the amine is a secondary amine.

3. A process according to claim 1 wherein the amine is diphenyl amine.

4. A process according to claim 1 wherein the aluminum trialkyl is aluminum tri-isobutyl, the Al:Ti mol ratio at the end of step (a) is about 0.8, the amine is diphenyl amine, and the aluminum dialkyl chloride is aluminum diethyl chloride.

5. A method for the preparation of a polymerization catalyst which comprises steps (a), (b), and (c) according to claim 1.

References Cited

UNITED STATES PATENTS 2,971,925  2/1961  Winkler et al. _____ 252—429
3,165,503  1/1965  Kahn et al. _____ 260—94.3

JOSEPH L. SCHOFER, Primary Examiner

R. A. GAITHER, Assistant Examiner

U.S. Cl. X.R.

252—429